US005986161A

United States Patent [19]

Akae et al.

[11] Patent Number: 5,986,161

[45] Date of Patent: Nov. 16, 1999

[54] METHODS FOR NEUTRALIZING/ DETOXIFYING AND STABLY FIXING/ SOLIDIFYING HAZARDOUS COMPOUNDS

[76] Inventors: Yukoh Akae, 1-10-18, Maikosaka, Tarumi-ku, Kobe-shi Hyogo-ken; Kazuo Kote, 1969 Kawashima-cho, Asahi-ku, Yokohama-shi Kanagawa-ken, both of Japan

[21] Appl. No.: 09/138,952

[22] Filed: Aug. 24, 1998

[51] Int. Cl.$^6$ .................................. A62D 3/00; C02F 1/42

[52] U.S. Cl. ............................ 588/231; 588/13; 588/236; 588/256; 210/682; 210/688

[58] Field of Search .............................. 588/256, 13, 236, 588/231; 405/128; 210/747, 682, 688

[56] References Cited

U.S. PATENT DOCUMENTS

| | | | |
|---|---|---|---|
| 5,202,033 | 4/1993 | Stanforth et al. | 210/147 |
| 5,700,107 | 12/1997 | Newton | 405/128 |
| 5,722,928 | 3/1998 | Forrester | 588/256 |

*Primary Examiner*—Gary P. Straub
*Assistant Examiner*—Eileen E. Nave
*Attorney, Agent, or Firm*—Irving Keschner

[57] ABSTRACT

Hazardous compounds are chemically treated to remove various pollutants by subjecting the compounds (samples) to various process steps, including selecting specific solvents and using them, treating the sample at room temperature or below (30° C. or lower); separating fatty acids mixed with heavy metal and semi-metal compounds as well as the separation of organic substances (including halogenated compounds) added to heavy metals and semi-metals; and using sodium nitrite and sodium 1-naphthylamine-4-sulfonate in combination from specific solvents, thereby in the sample, adsorbing and fixating halogen substances related to air pollution, coagulation resulting from the decomposition of fatty acids and the fixation of such compounds by quicklime and graphite and the stable fixation of heavy-metal oxide and semi-metal compounds using solvents having redox action and the formation of their complex salts and compounds, the above being accomplished by a continuous processing method.

8 Claims, No Drawings

METHODS FOR NEUTRALIZING/ DETOXIFYING AND STABLY FIXING/ SOLIDIFYING HAZARDOUS COMPOUNDS

BACKGROUND OF INVENTION

1. Field of Invention

Methods for detoxifying and fixing environmental pollutants (compounds known as a source of environmental pollution) such as heavy metal compounds (Cu, Pb, Cr, Zn, Co), semi-metal compounds (P, As, Sb, Bi) and halogenated compounds.

2. Description of Prior Art

According to the current method for treating environmental pollution, the processing of pollutants can be completed by heat treatment at high temperatures to make heavy metal oxides and semi-metal oxides; yet no method is known to stably fix these oxides. Although some commentators say that those compounds are not environmentally hazardous when converted into oxides, it is clear that the compounds are not sufficiently treated for pollution just by being oxidized. Specific environmental pollutants such as heavy metal, semi-metal, and halogenated compounds are thus required to be completely neutralized/detoxified.

In order to deal with environmental pollution as set forth hereinabove, the following is required: (1) safe handling and treatment of potentially hazardous gaseous elements (halogen group) that are added to heavy metals and semi-metals; (2) safe fixing of heavy metals and semi-metals as well as the (organic) elements added to them; (3) safe handling and thermal treatment of secondary pollution in soil due to the dumping of heavy metals and semi-metals; and safe handling and secondary treatment of polluted colloidal substances primarily semi-metal compounds in polluted water.

Hazardous compounds known for environmental pollution such as heavy metal, semi-metal, and halogenated compounds, are in a state of secondary pollution in most cases. They exist in (1) colloidal sludge; (2) soil containing spread ash from an incinerator, especially in ash incompletely combusted; and (3) polluted soil and water that are dumped untreated. Therefore it is desired to provide a procedure for removing hazardous heavy metal and semi-metal compounds existing in the forms noted hereinabove.

SUMMARY OF THE PRESENT INVENTION

The present invention solves the problems noted hereinabove by chemically treating the compounds by selecting specific solvents and using them, treating the sample at room temperature or below (30° C. or lower); separating of fatty acids mixed with heavy metal and semi-metal compounds as well as the separation of organic substances (including halogenated compounds) added to heavy metals and semi-metals; forming diazo salt by using sodium nitrite and sodium 1-naphthylamine-4-sulfonate in combination from specific solvents, thereby forming alkylsulfonic acid salt and alkyl sulfonium salt in the presence of sulfonic acid salt so as to fix organic substances mixed in the sample; adsorbing and polymerizing the hydrocarbon group, which is generated in the sample during treatment, through the action of electron exchange ions of hydroxyl group, where hydroxyl and sulfonyl groups are formed through substitution by using 2-naphthol-4-sulfonic acid and calcium oxide in combination (Solvent 3) out of the specific solvents (Formula 5); and to form chlorine adsorbent through substitution with calcium oxide in the presence of sodium sulfonyl group (Formulas 5 and 10).

New reactions such as substitution, metal exchange, formation of various complex (and coordination) compounds occurred, in the process of treatment with the solvents employed, between the heavy metal compounds (Pb, Cr, Zn, Fe, etc.) and semi-metal compounds (P, As, Sb, Bi, etc.) contained in the sample; the focus being on the fixation and stabilization of semi-metal compounds. The major reason stated hereinabove is to prevent these semi-metal compounds from becoming the source of aerial pollution after evaporation or when powdered and thus high-temperature thermal treatment is avoided.

As the final step of treatment, the hazardous substances are fixed and stabilized by adsorbing electron donors and electron receptors that are formed in the previous step with graphite inter-layer compounds (stirring time is approximately one hour and sitting time is approximately one hour.) Soil-like crystal is employed).

DESCRIPTION OF THE INVENTION

In order to provide a simplified explanation for the procedure in its order, heavy metal and semi-metal compounds in the hazardous pollutants (hereinafter referred as the sample) existing in various forms are respectively referred to as:

Sample (A) for the sample related to the treatment of heavy metal hazardous compounds; and Sample (B) for the sample related to the treatment of semi-metal hazardous compounds. Sewage sludge, 3 liters in a colloidal form, was chosen for the embodiment of sample (A). Incinerator ash, water content about 50%, was chosen for the embodiment of sample (B).

In Sample (A), the heavy metals contained in the sample, cadmium chloride, alkylated mercury, lead monoxide, and the like, are the subjects. Others are fatty acid esters and common soil, water content is about 120%.

In sample (B), the semi-metal compounds are arsenic oxide, arsenic sulfide, antimony oxide, antimony chloride, bismuth chloride, and the like. Otherwise the fatty acid group was contained as a component of the solution.

Originally saturated and unsaturated fatty acids has been mixed in the samples (A) and (B). In addition, both heavy metal and semi-metal compounds were contained in the samples (A) and (B), however, as stated hereinabove, for ease of explanation in the embodiment, the treatment of heavy metals in sample (A) and the treatment of semi-metals in sample (B) will be the primary focus of the following discussion. Treatment followed a three-step procedure. At the first and second step, the samples (A) and (B) are treated separately, but they are treated by the same method at the third step. (Contrary to predictions, it was found as a result that the same agents and procedure for chemical treatment were applicable to heavy metals and semi-metals and that the treatment can be performed at room temperature or below.) The following are the step-by-step explanations for the treatment procedure.

Treatment of Sample (A)—The first step: The agents to be used are (Solvent 1) Sodium nitrite (promoter) and (Solvent 2) Sodium 1-naphthylamine-4-sulfonate. Solvents 1 and 2 are added one after another to sample (A) and stirred for approximately five minutes. The ratio of adding (Solvents 1 and 2) is one-to-two (1:2), but the ratio itself has no significant meaning. However, it does have an important meaning (discussed hereinafter) in relation to the fixation of semi-metals (phosphorus compound, arsenic compound, etc.) that belongs to Class B of sample (A).

At this step, the purpose is to form alkaline substances through dehydration (Formula 1) of (Solvent 1) and (Solvent 2). Reactants and nitrous groups will carry out substitution (Formula 2) with unsaturated fatty acids and fatty acid esters contained in sample (A), and then, as shown in (Formula 3), proceed to decomposition (condensation) of organic acids (fatty acids) contained in sample (A). In other words, the implication of the decomposition of fatty acids is to promote effective fixation through substitution and exchange reaction of heavy metal compounds that follow thereafter.

Secondly, aromatic primary amine is added. The reaction occurring at this point is diazo reaction (Formula 4), and furthermore, azo compounds will be formed through diazotate reaction (formula 6) and coupling reaction (Formula 7). The same will lead to the formation of hydrazine ($N_2H_4$).

In addition, the goals aimed at the first step are the separation and crystallization (condensation) of the metal group, fatty acid group, other phenol group, and organic substances contained in the sample (A). This means the dechlorination with diazonio group (—N2), and the formation of insoluble crystal compounds hydrazine ($RR'C{=}NNH_2$) by applying the action of hydrazine to organic compounds having aldehyde and ketone group.

In other words, the nature of heavy metals detected in the sample (A) was the mixture of cadmium chloride, chromate and dichromate salt, cupric dioxide, alkylated mercury, and the like. Moreover, saturated fatty acid ester mixed in the sample (A) maintains the viscosity of the sample (A) and is the cause for inhibiting the progress of metal exchange reaction. Therefore, in order to reduce the viscosity, (Solvents 1 and 2) are added and stirred at first. The major part of a series of reactions (Formula 4) at this point is diazo reaction and various diazonium salts were formed. Other series of reactions (Formulae 1 through 7) are shown for reference. Furthermore, as shown in (Formula 9), (Solvent 1) is also provided for dechlorination.

After stirring for five minutes and sitting for about ten minutes, the next step follows.

The second step: Agents to be used are as follows: (Solvent 3) 2-naphthol-4-sulfonic acid, or (Solvent 4); (Solvent 4) 2-naphthol-7-sulfonic acid; (Solvent 5) quicklime (adsorbent 5).

The treatment purpose at this step is to combine with heavy metals contained in the sample by forming complex compounds of diazo salt, which is formed at the first step, and (Solvent 3) was employed in the embodiment. In addition, (adsorbent 5) is specified as the dechlorinating agent for metal oxides and halogen adsorbent. Next, with the presence of the sulfonic group as the functional group formed in the solution upon adding (Solvent 3), it was aimed to form a complex compound (sulfonic salt) of various transition metals (lead, copper, iron, zinc, chromium, etc.) that are contained in the sample. In other words, the existence of sulfonic group ($—SO_2(OH)$) is to carry out aromatic electrophilic substitution.

In such a manner, heavy metals that are contained in sample (A) are isolated from other organic substances existing simultaneously and dechlorinated. As to other metals, partially the formation of sulfide complex (copper, lead, iron, etc.) and the binding of heavy metals (chromium-ammonium, nickel-cyanogen, etc.) from the formation of coordination compounds will take place. This means ammonium and ethylene groups will form. Coordination bonding will be discussed below with respect to sample (B).

Therefore, for example, organic mercury, mercury ions bonded with hydrocarbon groups exist in the solution. Insertion of the sulfonyl group will lead to the formation and fixation of mercury O-alkylsulfoxylate (RO—S(=O)—Hg) (Formula 11). Heavy metal ions individually, for instance, a trivalent metal ion, will be reduced to divalent metal ions as shown in (Formula 12).

Thereafter, beta-naphthol sulfonic acid, (Solvent 3), acts as the adsorbent of hydrocarbon groups (monovalent alkyl groups). The reason this solvent was selected is because its toxicity is lower than alpha-naphthol. The phenolic sulfonyl group prevents the generation of hydrocarbon gas during the process of stable fixation of heavy metals at the first and second steps. After stirring the mixture is left in place for approximately 60 minutes. This time period may vary depending on the volume of treatment.

Treatment of the Sample (B). Consecutively, the treatment procedure of semi-metal hazardous compounds is explained by using sample (B).

The semi-metal noted herein is the 15th family in the periodical table including phosphorus, arsenic, vanadium, antimony, and the like.

The agents to be used at the first step are: (Solvent 1) Sodium nitrite; (Solvent 2) Sodium 1-naphthylamine-4-sulfonate.

The hazardous compounds that belong to the 15th family in the periodical table and were detected are arsenic trioxide, antimony tetroxide, [phosphorus-9-uolfuramic/Wolframic acid], and phosphorus compounds with copper and lead.

The following is an explanation of the stabilization and fixation of semi-metal compounds (P, As, Sb, Bi, etc.) in the sample (B), following each step. The first step (Sample B): Purpose of this step is same as that in sample (A), to turn various fatty acid esters into alcohol and crystal (condensation) through dehydration. The process of formation is what is stated using (Formula 1), (Formula 2), (Formula 3), and (Formula 4). The agents and stirring time to be employed are the same as for sample (A).

The second step (Sample B):—Agents to be Used: (Solvent 3) 2-naphthol-4-sulfonic acid or (adsorbent 5); (adsorbent 5) Calcium oxide. The same procedure is followed as for the sample (A). As to the agents to be used, all the same agents in the same volume are to be used.

The most important issue is to carry out dechlorination, isolation, and stable fixation of arsenic and antimony oxides. In other words, the reaction of (Formula 5) occurred due to sulfonic group in the solution of (Solvent 3) and hydroxyl sodium group formed at the first step of sample (B), and then, arsenic trioxide will be fixed, following (Formula 11).

The formation of sodium hydrogen sulfonate in (Formula 5) acts as the dechlorinating agent. An example of reaction formula is shown in (Formula 13). In addition, sulfonic group existing in the solution of (Solvent 3) has one hydronium group. The phenolic hydroquinone acts as an electron exchanger to reversibly oxidize or reduce ions. Based on this action, when putting in (Solvent 2) at the first step, the formation of azo compounds by coupling reaction (Formula 7) after turning aromatic primary amine into diazo compounds indicates the formation of hydrazone. Also, aldehyde and ketone of alkylated compounds are isolated and some crystal bodies such as phenyl hydrazone ($RR^*{=}C{=}NNC_6H_6$) are formed.

On the other hand, alkaline-earth metal (Ca, Sr, Ba, etc.) sulfide and semi-metal (As, P, Sb, Bi) sulfide will be sulfonated in the presence of the sulfonic groups of the sulfonic acid, and both sulfonic salts will bind together as a complex compound (double salt).

The solvents to be used at the second step include (Solvent 3) to (adsorbent 5) and their combinations. In other words, the combination of (Solvent 3) to (Solvent 6) as well as (Solvent 4) to (Solvent 5) are to be used. In the embodiment, the combination of (Solvent 3) to (Solvent 6) was employed.

The major purpose at the second step is to carry out delinquescential crystallization of various alkyl halogen and sulfuric alkyl groups in the presence of phenolic hydroquinone and phenolic sulfonyl group and to adsorb and fix ionized halogen group (chlorine) and alkyl group onto calcium hydrogen sulfite. Of course, reaction formulae used for formation at the first step were repeatedly performed, and as another purpose, the elevation of the temperature of the sample due to exothermal reaction of calcium oxide is utilized for the condensation of alkylsulfonic acid salt.

In such a manner, to determine what the volume of various solvents to be used in the first and second step are, as stated in the treatment of samples (A) and (B), it is necessary to know quantitative information of heavy metal and semi-metal halogenated compounds and sulfide contained in the substance subject to treatment, or the sample candidate, and the volume to be used will be determined as a result. In other words, the chemical and physical properties of the substances to be treated are not even. After completing the above treatment, sitting for approximately 60 minutes is allowed to promote separation between solution and solid parts.

The third step: This step is common to samples (A) and (B). (Graphite treatment). Agent to be used—(adsorbent 6) Graphite (in a form of soil grain). (adsorbent 6) is added to the samples (A) and (B) and mixed and stirred. The purpose is to form graphite inter-layer compound. Between the layers, the following are inserted. Electron donors such as alkaline metals, alkaline-earth metals, transition metals, etc.; and electron receptors such as halogen, halogenated metal compounds, metal oxides, Lewis acids, etc. (A variety of inter-layer reactions will be performed).

The above happens because graphite has the characteristic of forming inter-layer compounds where reactants are inserted between layers through electron transfer as reacted with potassium, sodium, halogen, sulfuric sulfide, oxide and the like. The major reason to mix graphite is as stated hereinabove.

Graphite used at this step (in a form of soil grain) was 8 wt % to the sample (A) and 6 wt % to the sample (B). Since the amount of chloride in the sample (A) is large, in order to prevent it from spreading into the air and to maintain safety, exhaust gas generated inside the treatment facility was directed by forced ventilation into the reactor/furnace that contains (Solvent 3) solution and is located in the exterior chamber of the treatment apparatus (see copending application Ser. No. 09/138,951, filed concurrently herewith and entitled "Method and Apparatus for Removal of Organic Hazardous Substances Using Selected Solvents".

Stirring time at the third step after mixing (adsorbent 6) is about one hour for both samples (A) and (B). Also, the time for sitting and reaction is one hour, respectively. As a result, both samples were clearly separated into solid phase and transparent liquid phase, and were separated upon confirming the safety of both liquid components. Consequently, environmental pollution was found in the separated components.

The present invention thus neutralized/detoxified and fixed heavy metal (Fe, Cu, Cr, Pb, etc.) and semi-metal (P, As, Sb, Bi, etc.) compounds, halogen and halogenated compounds, sulfide, and the like in the course of the continuous treatment process. Prior to the treatment process, no external heat was introduced and all reactions were conducted at room temperature or below providing economy and safety. Since heavy metal, semi-metal, halogenated, and sulfide compounds, etc., that are fixed by the final treatment with graphite are graphite inter-layer compounds, the physical properties of graphite such as thermal insulation and friction resistance at a high temperature can be retained. It was found safe for various compounds inserted between the layers of graphite, such as heavy metal, semi-metal, and halogenated compounds, since they were not dissipated into water.

The fixation of hazardous substances with safety has thus been provided which in turn provides an effective treatment for environmental pollution.

It is possible to neutralize/detoxify the water and sludge known for environmental pollution and make them environmentally safe. For example, the neutralization/detoxification of sewage treatment plants, polluted water and sludge from animal farms can be accomplished.

It is possible to provide treatment for environmentally safe fixation of hazardous substances from mines and chemical plants, etc.; and the treatment for environmentally safe fixation of polluted soil surrounding these facilities.

It is possible to provide treatment for environmentally safe fixation of hazardous substances contained in incinerated ash and debris from incineration fields; and treatment for neutralization/detoxification of soil surrounding the incineration fields polluted with dioxane and the like originating from soot and smoke.

It is also possible to have a treatment for neutralization/detoxification of hazardous substances in obsolete chemical weapons and to construct cleaning facilities that are differentiated by type of business in order to prevent expansion of pollution to a wide range of area.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

TABLE 1

TABLE 1

| |
|---|
| (1) $NaONO + H_2O \rightarrow NaOH + HONO$ |
| (2) $RCOOR' + HONO + H_2O \rightarrow RCOOH + R'OH + HNO_2$ |
| (3) $RCOOH + (SO_3Na) \rightarrow ROC\ (SO_3Na) + (OH)^-$ |
| (4) $R.OH + [Ar.SO_3K]^+ \rightarrow R.SO_3K + ArOH$ |
| (5) $Ar(SO_3H) + NaOH \rightarrow Ar.OH + Na(SO_3H)$ |
| (6) $(HSO_3)ArNH_2 + HONO \rightarrow [ArN^+{\equiv}N] + OH + H_2O$ |
| (7) $[ArN_2]\ ^+(SO_3H) + NaOH \rightarrow Na^+\ (Ar{-}N{-}O^-]$ |
| (8) $[ArN^+{\equiv}N] + [Ar'NH_2] \rightarrow [ArN_2NHAr']$ |
| (9) $Ar.N_2([ArN^+{\equiv}N] + (SO_3K) \rightarrow ArN{=}N(SO_3K)$ |
| (10) $2Na(HSO_3) + 2Cl^-aq \rightarrow 2NaCl + (HSO_3)^-aq$ |
| (11) $As_2O_3 + 6R'OH \rightarrow 2As(OR')_3 + 3H_2O$ |
| (12) $R.Hg + (SO_2)aq \rightarrow [RO{-}S({=}O){-}Hg]$ |
| (13) $CdCl_2 + 2NaHSO_3 \rightarrow Cd(HSO_3)_2 + 2NaCl$ |
| (14) $2Cr^{6+} + (SO_2)aq \rightarrow 2Cr^{6+} + (SO_4)^{2-} + 4H^+$ |
| (15) $Ca(SO_3Na)_2 + 2RCl \rightarrow CaCl_2 + 2R(SO_3Na)$ |
| (16) $Ar(OH) + C_3H_7 \rightarrow Ar(OH).CH_3.CH_2.CH_2^-$ |
| $Ar(OH).(CH_3)_2.CH^-$ |
| (17) $CaO + H_2O \rightarrow Ca(OH)_2 + 63.6K\ j/mol$ |
| $Ca(OH)_2 + 2\ (HSO_3)aq \rightarrow Ca(HSO_3) + 2(OH)^-aq$ |
| (18) $Ca(SO_3H)_2 + 2R'Cl \rightarrow CaCl_2 + 2R'(SO_3H)$ |
| (19) $CuCl_2 + Ca(SO_3H)_2 \rightarrow CaCl_2 + Cu(SO_3K)_2$ |
| (20) $2SbCl_3 + 3Ca(SO_3H)_2 \rightarrow 3CaCl_2 + 2Sb(SO_3H)_3$ |
| (21) $2Ca(HSO_3)_2aq + As_2O_5 \rightarrow Ca_2As_2O_5 + 2(HSO_3)^-aq$ |
| (22) $P_2O_5.18WO_3 + (SO_3K) \rightarrow I(SO_3K).mP_2O_5.nWO_3$ |

What is claimed:

1. A method of neutralizing and fixing combinations containing hazardous heavy metal compounds comprising the steps of:

adding sodium nitrite and sodium 1-naphthylamine-4-sulfonate to said combinations;

stirring the resultant mixture for about 5 minutes;

allowing the mixture to set for about 10 minutes;

adding an acid selected from the group consisting of 2-naphthol-4-sulfonic acid and 2-naphthol-7 sulfonic acid, and calcium oxide to said mixture;

stirring the mixture;

allowing the mixture to set for about one hour;

adding graphite;

stirring for about one hour; and allowing the mixture to set for about one hour.

2. The method of claim 1 in which the ratio of sodium nitrite to sodium 1-naphthylamine-4-sulfonate is approximately 1 to 2.

3. The method of claim 2 in which the graphite is approximately 8 percent by weight of said combination.

4. The method as claimed in claim 2 further comprising the final step of separating the liquid final product from the solid final product.

5. A method of neutralizing and fixing mixtures containing hazardous semi-metal compounds comprising the steps of:

adding sodium nitrite and sodium 1-naphthylamine-4-sulfonate to said mixture;

stirring said mixture for about 5 minutes;

allowing the mixture to set for about 10 minutes;

adding an acid selected from the consisting of 2-naphthol-4-sulfonic acid and 2-naphthol-7-sulfonic acid, and calcium oxide to said mixture;

stirring the resultant mixture;

allowing the mixture to set for about 60 minutes;

adding graphite;

stirring for about one hour; and allowing the mixture to set for about one hour.

6. The method as claimed in claim 5 in which the ratio of sodium nitrite to sodium 1-naphthylamine-4-sulfonate is approximately 1 to 2.

7. The method as claimed in claim 5 in which the graphite is approximately 6 weight percent of the original mixture.

8. The method as claimed in claim 5 further comprising the final step of separating the liquid final product from the solid final product.

* * * * *